(12) United States Patent
De Lamberterie (10) Patent No.: US 8,353,612 B2
(45) Date of Patent: Jan. 15, 2013

(54) LIGHT GUIDE WITH COUPLING PORTION HAVING A PLURALITY OF REFLECTIVE FACETS

(75) Inventor: Antoine De Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 172 days.

(21) Appl. No.: 12/720,087

(22) Filed: Mar. 9, 2010

(65) Prior Publication Data

US 2010/0232172 A1 Sep. 16, 2010

(30) Foreign Application Priority Data

Mar. 12, 2009 (FR) ..................................... 09 01154

(51) Int. Cl.
*F21V 7/04* (2006.01)

(52) U.S. Cl. ........ 362/551; 362/609; 362/621; 362/623; 362/560; 362/511

(58) Field of Classification Search .................. 362/555, 362/511, 516, 517, 608–610, 621, 307, 615, 362/628, 612, 613, 560

See application file for complete search history.

(56) References Cited

U.S. PATENT DOCUMENTS

| | | | |
|---|---|---|---|
| 4,792,884 A | 12/1988 | Suman et al. | |
| 6,193,383 B1 * | 2/2001 | Onikiri et al. | 362/26 |
| 6,356,394 B1 * | 3/2002 | Glienicke | 359/641 |
| 7,490,962 B2 * | 2/2009 | Liu et al. | 362/307 |
| 7,690,803 B2 | 4/2010 | Miyashita et al. | |
| 7,731,400 B2 | 6/2010 | Dubosc et al. | |
| 7,755,811 B2 | 7/2010 | Herloski et al. | |
| 2006/0227551 A1 | 10/2006 | Houck | |
| 2007/0002567 A1 | 1/2007 | Herloski et al. | |
| 2008/0019139 A1 | 1/2008 | Dubosc et al. | |
| 2008/0030975 A1 | 2/2008 | Miyashita et al. | |
| 2009/0034264 A1 | 2/2009 | Zhu et al. | |
| 2010/0046219 A1 | 2/2010 | Pijlman et al. | |

FOREIGN PATENT DOCUMENTS

| | | |
|---|---|---|
| EP | 1739946 A1 | 1/2007 |
| EP | 1881263 A1 | 1/2008 |
| EP | 1881265 A1 | 1/2008 |
| WO | 2008126011 A1 | 10/2008 |

* cited by examiner

*Primary Examiner* — Robert May (74) *Attorney, Agent, or Firm* — Jacox, Meckstroth & Jenkins (57) ABSTRACT

An optical device, in particular for a motor vehicle, such as a lighting or signaling device, this device comprising at least one light guide which is designed to guide at least part of the light which is emitted by a source of light, the light guide comprising at least one output surface and at least one main reflection surface, which is designed to reflect towards the output surface light which is propagated in the guide, the light guide comprising a portion for coupling with the source of light, this coupling portion having a transverse axis (Y), wherein the coupling portion is arranged such that the light which is emitted from this coupling portion is propagated in the light guide, around the transverse axis, according to a total angular opening, measured around this transverse axis, which is strictly less than 360°, and in particular is less than 320° or 300°.

24 Claims, 5 Drawing Sheets

LIGHT GUIDE WITH COUPLING PORTION HAVING A PLURALITY OF REFLECTIVE FACETS

CROSS-REFERENCE TO RELATED APPLICATIONS

This application claims priority to French Application No. 0901154 filed Mar. 12, 2009, which application is incorporated herein by reference and made a part hereof.

BACKGROUND OF THE INVENTION

1. Field of the Invention

The invention relates to an optical device, in particular for a motor vehicle, such as a lighting or signaling device.

2. Description of the Related Art

A lighting or signaling device for a motor vehicle is known from patent application EP 1 881 263, which is equivalent to U.S. Patent Publication 2008/0019139 which is incorporated herein by reference and made a part hereof. The lighting device can emit a light beam "F" according to a longitudinal optical axis "A".

This optical device comprises at least one sheet for guiding the light, at least one part of which is in the form of a portion of spherical cap.

The guide sheet is thus delimited in the direction of the thickness by two guide surfaces which are substantially parallel to one another along at least part of the sheet.

The guide sheet is delimited laterally by a front section for output of the rays of light, and by a rear section for reflection of the light. The ends of the reflection section are directly connected to the ends of the output section, such as to form the outer contour of the guide sheet.

The contour of the section for output of the light forms a flat arc of a circle.

The guide sheet comprises an aperture for intake of the light into the sheet.

A source of light is provide in the aperture, in the vicinity of, or in contact with the section for intake of the rays of light.

The source of light can emit rays of light according to a globally radial direction around a source axis "S" which is at right-angles to the guide sheet. More specifically, the source of light can emit a fan of rays of light radially, at least in the direction of the reflection section.

The guide sheet is made of a transparent material, the refraction index of which is greater than the refraction index of the medium in which the lighting device is designed to be immersed, for example, air. Thus, a ray of light which is introduced into the thickness of the sheet via its intake section meets the upper or lower guide surfaces with an angle of incidence relative to the normal line "N" which is greater than a limit refraction angle. The ray can thus be reflected totally by the guide surfaces.

The ray of light is thus guided in the thickness of the guide sheet by successive reflections between the two guide surfaces.

The incident rays of light which start towards the rear are designed to be reflected by the reflection section, then the rays of light thus reflected are directed towards the output section. The reflected rays of light thus emerge via the output section.

The source of light can be a so called side-emitter light-emitting diode or LED, which emits rays of light which are directed substantially perpendicularly to the source axis "S".

The source of light can also consist of an incandescent lamp, for example, a halogen lamp with an axial filament, which is inserted in the contour delimited by the intake section. In the case when an area of the guide sheet in the vicinity of the intake section is made of glass, it is thus advantageously possible for the remainder of the sheet to be made of a plastic material which is over-molded onto this glass area. A design of this type makes it possible to eliminate the thermal problems which the use of an incandescent source could generate.

According to one embodiment of this patent application EP 1 881 263, the LED of a Lambert type is disposed in a aperture which opens only into one of the guide surfaces.

This LED is disposed such that its emitter surface is flush with the surface of the coupling area, which has been arranged such that the rays of light which are emitted by the LED are then redirected radially relative to the level of the coupling area.

The coupling area has locally an intake area in the form of a convex curved surface, on the surface of the side of which the LED is located, and, on the opposite surface and opposite this convex surface, it has an area with a form which approximates that of a cone.

The coupling area has symmetry of revolution.

This can make it possible to obtain performance levels which are comparable to the case of an LED of the side-emitter type.

However, the efficiency of a device of this type is reduced when the rear surface does not surround the LED sufficiently. This is the case, for example, when the dimensions of the rear surface are relatively small.

In this known device, taking into account the form of revolution of the area of coupling relative to the axis of the LED, the light is regularly distributed around the axis of the LED in the sheet.

The geometry of the sheet and of the rear surface makes it possible to distinguish several areas.

There is firstly an area in which the rays of light are directed towards the rear surface, and are returned cleanly forwards according to the optical axis.

There is then an area which corresponds to the rays which start directly towards the output surface of the sheet, and emerge from this sheet according to an angle which allows them to participate in the photometry of the beam.

Between these areas, the rays of light are either lost definitively, since they are reflected totally by the output surface, or they are refracted by the output surface towards excessively large angles which do not allow them to participate in the photometry of the beam.

Thus, the known device can be subject to relatively substantial losses of performance.

There is, therefore, a need to provide an optical device that facilitates reducing or eliminating substantial losses of performance.

SUMMARY OF THE INVENTION

The objective of the invention is in particular to eliminate the aforementioned disadvantages.

The object of the invention is thus an optical device, in particular for a motor vehicle, such as a lighting or signaling device, this device comprising at least one light guide which is designed to guide at least part of the light which is emitted by a source of light, the light guide comprising at least one output surface and at least one main reflection surface, which is designed to reflect towards the output surface light which is propagated in the guide, the light guide comprising a portion for coupling with the source of light, this coupling portion having a transverse axis, the device being characterized in that the coupling portion is arranged such that the light which is emitted from this coupling portion is propagated in the light guide, around the transverse axis, according to a total angular opening, measured around this transverse axis, which is strictly less than 360°, and in particular is less than 320° or 300°.

In other words, according to the invention, the total sum of the angular openings of the beams which are emitted from the coupling area is strictly less than 360°, and in particular is less than 320° or 300°.

By means of the invention, the coupling portion of the light guide makes it possible to direct the light in selected directions, such that there is no, or little, photometric loss.

For example, contrary to the device described in the aforementioned patent application EP 1 881 263, which uses a coupling portion with symmetry of revolution which returns the light obtained from the source of light in all directions around the axis of the source of light, the present invention makes it possible to channel the light only in the directions which are useful for the photometry of the light beam which is emitted from the light guide.

The coupling portion according to the invention makes it possible in particular to prevent certain rays of light from being directed towards the areas of the output surface, thus giving rise in an undesirable manner to reflection of the rays which prevents the latter from being emitted from the light guide, or to refraction of these rays in a direction which is inefficient for the performance of the output beam.

The invention is particularly advantageous when the rear reflection surface(s) of the light guide does/do not surround the source of light sufficiently.

In addition, the invention makes possible improved homogeneousness, firstly because there is avoidance of an excessive quantity of direct light, which creates a hot spot when the light guide is seen from the sides, and secondly because the light is accumulated at the level of the end of the rear reflection surface, which makes it possible to balance better the quantity of light which is obtained from the edge of the rear reflection surfaces, in comparison with the quantity of light which is emitted by the base.

In addition, the invention can make it possible to prevent a lack of homogeneousness because of the presence of the source of light on the path of the rays of light, since the rays which are reflected by the areas of the reflection surface behind the source of light are partially hidden by the coupling portion.

Advantageously, the coupling portion is arranged such that the light which is emitted from this coupling portion forms two light beams, a first beam being propagated in the light guide such as to reach the output surface of the light guide directly, and a second beam being propagated in the light guide such as to reach the main reflection surface, and the rays of the first light beam reach the output surface according to an angle which is selected such that these rays can be emitted from the light guide by being propagated on average in the direction of the optical axis, and in particular they are not reflected on the output surface.

The angular opening of the first beam, which is measured, for example, on a plane perpendicular to the transverse axis, is, for example, substantially equal to 20° or less, or even 15°.

The rays of the first beam can be substantially parallel to one another.

According to one embodiment of the invention, the rays of the second beam are propagated substantially radially around the transverse axis when they are emitted from the coupling portion.

Preferably, when the first and second beams are emitted from the coupling portion, they are disjointed, and, for example, are separated from one another by dark areas.

Preferably, when the first beam is emitted from the coupling portion, it has an angular opening which is smaller than that of the second beam, and in particular is at least twice as small, and, for example, is ten times as small.

According to one embodiment, the coupling portion comprises a first reflection facet which is designed to return the light which is obtained from the source of light directly, i.e., in particular without reflection on the main reflection surface, towards the output surface of the light guide.

This first facet has substantially a form which is selected in particular from amongst: a portion of inclined plane (for example, with an angle which is close to 45° relative to the transverse axis), or a section of a cylinder, or a section of a paraboloid.

If applicable, when the first reflection facet of the coupling portion has the form of a section of a cylinder, this cylinder can have an axis which is parallel to, or as a variant perpendicular to, the transverse axis of the coupling portion.

Advantageously, the coupling portion comprises a second reflection facet, which is designed to return the light obtained from the source of light towards the main reflection surface of the light guide, this second reflection surface having in particular, on its angular extent around the transverse axis of the coupling portion, symmetry of revolution relative to this transverse axis.

For example, the second reflection facet has a form which is selected from amongst: a section of a cone, or a section of a paraboloid.

According to one embodiment of the invention, the first and second reflection facets of the coupling portion are connected to one another via at least one step contained on a plane which itself substantially contains the transverse axis of the coupling portion.

Advantageously, the first and second reflection facets of the coupling portion are connected to one another via at least one transition facet, which is preferably substantially tangent at least to the second reflection facet, and in particular is designed to reflect the light towards the main reflection surface.

This transition facet makes it possible to direct the rays of light towards the end limits of the rear reflection surface, then progressively towards the remainder of the rear surface, closer to the source of light.

For example, the transition facet is formed by a portion of a surface of revolution.

This type of transition facet is more advantageous than a transition facet in the form of a step, since the step can give rise to production problems during the molding, as well as to additional photometric losses.

According to one embodiment of the invention, the coupling portion is symmetrical relative to a plane of symmetry which contains the transverse axis of the coupling portion.

The first reflection facet and/or the transition facet of the coupling portion can be bordered by at least one optically neutral connection facet.

The connection facet can be in the form of a section of a cone or a section of a cylinder.

According to one embodiment of the invention, the source of light is disposed at right-angles to a cavity, which is preferably not a through-cavity, formed in the light guide.

As a variant, the source of light is disposed substantially flush with an outer surface of the light guide.

Preferably, the source of light is designed to emit a light beam with a component which is substantially parallel to the transverse axis of the coupling portion.

If required, the source of light is disposed on the top of a substantially frusto-conical portion of the light guide.

According to one embodiment of the invention, the light guide is made in a single piece, in particular by molding, for example, by molding a plastic material.

The light guide can be in the form of a sheet.

Advantageously, the source of light comprises an LED.

These and other objects and advantages of the invention will be apparent from the following description, the accompanying drawings and the appended claims.

BRIEF DESCRIPTION OF THE ACCOMPANYING DRAWINGS

The invention will be able to be better understood by reading the following detailed description of non-limiting embodiments of the invention, and by examining the attached drawing, in which.

DETAILED DESCRIPTION OF THE PREFERRED EMBODIMENTS

Figure 1:
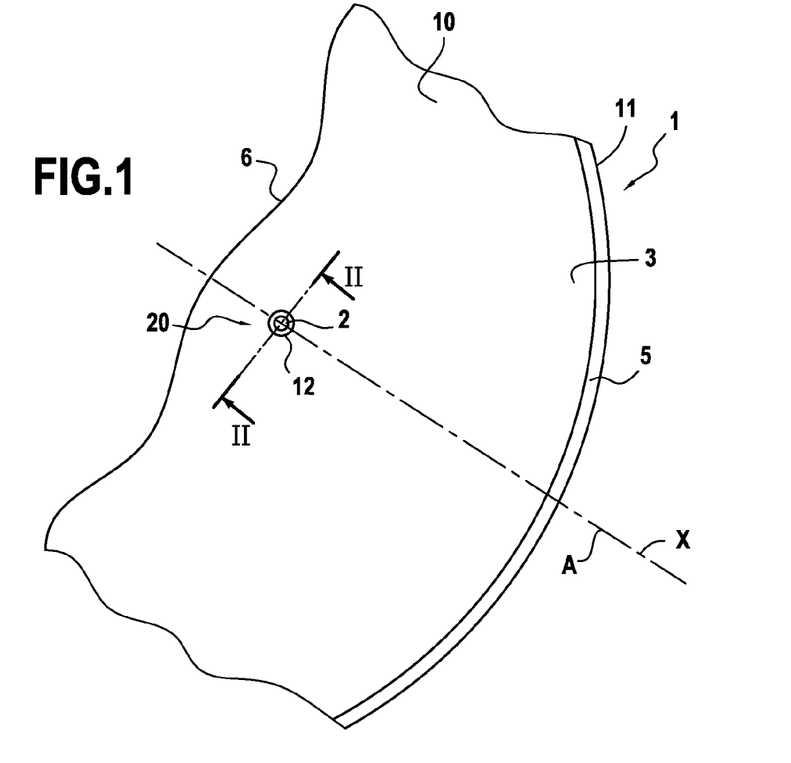
FIG. 1 illustrates schematically, partially, and in perspective, an optical device according to an embodiment of the invention.
Figure 2:
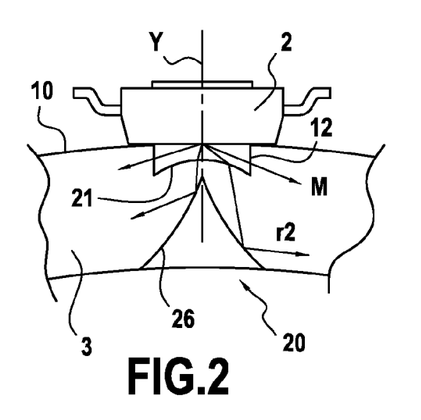
FIG. 2 represents the device in FIG. 1, schematically and partially, according to a transverse cross-section according to II-II.
Figure 3:
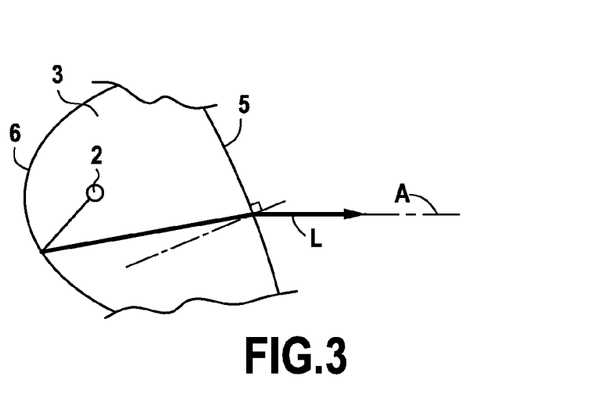
FIG. 3 illustrates, schematically and partially, the path of a ray of light reflected on the reflection surface of the light guide of the device in FIG. 1.

FIGS. 1 to 3 show an optical device 1 for a motor vehicle, such as a lighting or signaling device, comprising:

a source of light 2 which is formed by an LED of the Lambert, or axial emission type; and a light guide 3 which is designed to guide the light emitted by the source of light 2, the light guide 3 comprising at least one output surface 5 and at least one reflection surface 6 which is designed to reflect towards the output surface 5 light L which is propagated in the guide 3.

The light guide 3 is in the form of a sheet with a longitudinal axis X, and has two main surfaces 10 and 11, for example, which are not flat, and are substantially parallel to one another.

The thickness of this light guide 3 measured between the two main surfaces 10 and 11 is, for example, contained between 3 mm and 5 mm.

The output surface 5 can comprise serrations to diffuse the light obtained from this surface 5.

In the example described, the light guide 3 is monolithic, and is produced in a single piece, for example, by molding a plastic material with a refraction index n.

The plastic material used can, for example, be PMMA with a refraction index of 1.49, or PC with a refraction index of 1.59.

On at least a portion of its length, the reflection surface 6 can be aluminized, or as a variant, the surface 6 is designed to permit reflection of the light which is propagated in the guide 3 by simple or double total reflection.

As illustrated in FIG. 2, the light guide 3 comprises a cavity 12 for intake of the light.

This cavity 12, which is not a through-cavity, opens onto the main surface 10 of the light guide 3.

The LED 2 emits in a half-space, and is disposed against a coupling portion 20 of the light guide 3, at right-angles to the cavity 12.

The base 21 of the cavity 12 has a convex form.

As illustrated in FIG. 2, the rays r1 penetrate directly into the thickness of the coupling portion 20.

Other rays r2 are firstly refracted by the convex base 21 of the cavity 12, then reflected by the coupling portion 20 in the light guide 3.

In the example described, the device 1 is designed to emit, via the output surface 5 of the light guide 3, light with a brightness intensity contained between 50 candelas and 1000 candelas.

The coupling portion 20 will now be described in greater detail.

Figure 4:
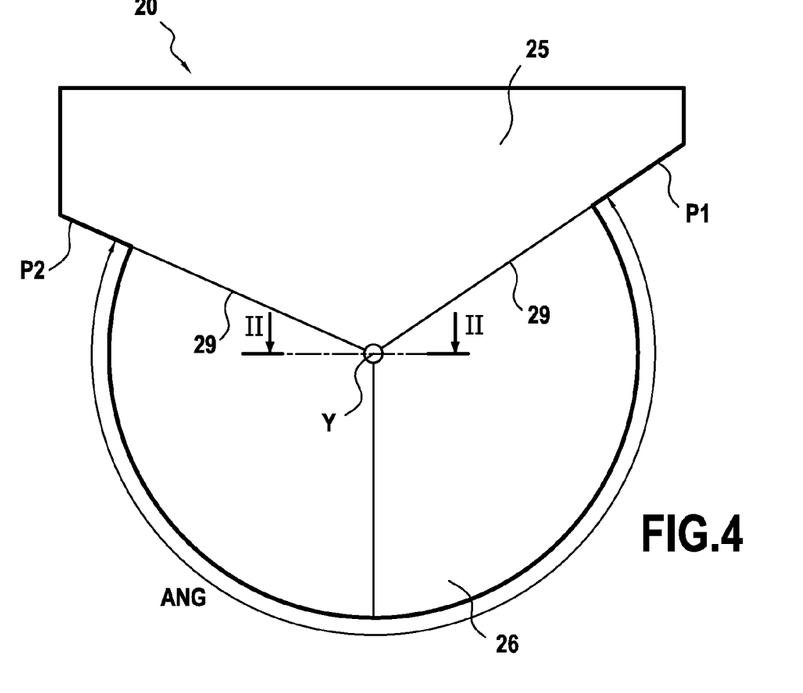
FIGS. 4 and 5 represent, schematically and partially, coupling portions according to two embodiments of the invention.

As illustrated in FIG. 4, the coupling portion 20 has a transverse axis Y.

The coupling portion 20 is designed such that the light which is emitted from this coupling portion 20 is propagated in the light guide 3 around the transverse axis Y, according to a total angular opening, measured around this transverse axis Y, which is strictly less than 360°, and in particular less than 320° or 300°.

This coupling portion 20 is designed such that the light which is emitted from this coupling portion 20 forms two light beams, a first beam being propagated in the light guide 3 such as to reach directly the output surface 5 of the light guide 3, and a second beam being propagated in the light guide 3 such as to reach the rear reflection surface 6.

The rays of the first light beam reach the output surface 5 according to an angle which is selected such that these rays can be emitted from the light guide, and in particular are not reflected on the output surface.

The rays which are emitted from the light guide 3 are refracted in directions which are substantially parallel to the optical axis.

The coupling portion 20 comprises a first reflection facet 25 (FIG. 4) which is designed to return the light obtained from the source of light 2 directly, i.e., in particular without reflection on the main reflection surface 6, towards the output surface 5 of the light guide 3.

In the example described, this first facet 25 has substantially a form of a portion of a plane which is inclined, for example, with an angle close to 45° relative to the transverse axis Y.

The coupling portion also comprises a second reflection facet 26, which is designed to return the light obtained from the source of light 2 towards the main reflection surface 6 of the light guide 3.

In the example described, this second reflection facet 26 has, on its angular extent ANG around the transverse axis Y, a symmetry of revolution relative to this transverse axis Y.

For example, the second facet 26 has a form of a section of a cone, which is obtained by cutting a cone with revolution of axis Y through two planes P1 and P2 which pass via the axis Y.

In the example in FIG. 4, the first and second facets 25 and 26 of reflection of the coupling portion 20 are connected to one another via steps 29 which are contained respectively on one of the planes P1 and P2.

As a variant, the first reflection facet 25 of the coupling portion 20 has a form of a section of a cylinder. This cylinder can have an axis which is parallel to, or as a variant perpendicular to, the transverse axis Y of the coupling portion 20.

Figure 5:
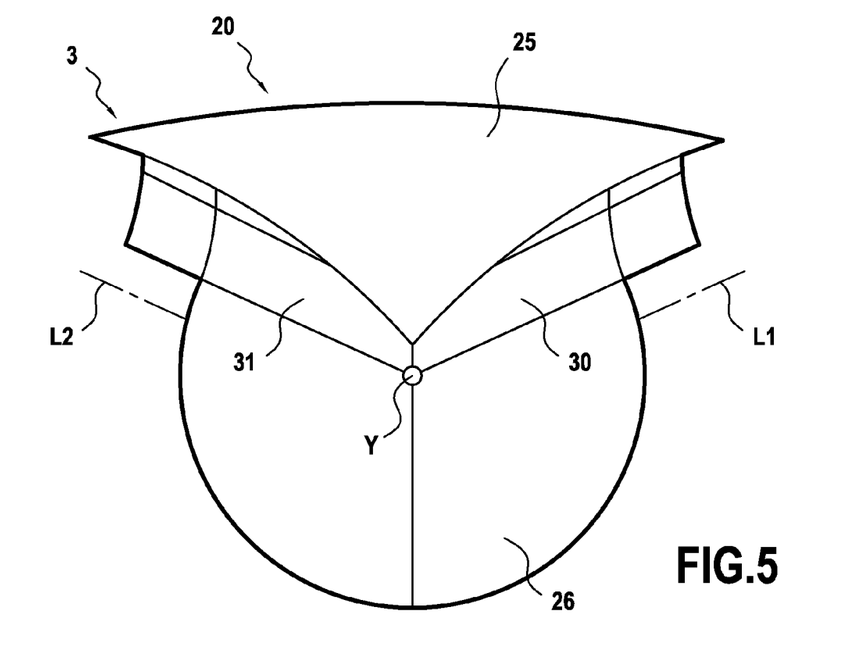

In the embodiment illustrated in FIG. 5, the first and second facets 25 and 26 of reflection of the coupling portion 20 are connected to one another via transition facets 30 and 31, which are substantially tangent to the second reflection facet 26, and are designed to reflect the light towards the rear reflection surface 6. For example, each transition facet 30; 31 is formed by a portion of a surface of revolution, for example, by a section of cylinder with an axis L1; L2.

Figure 6:
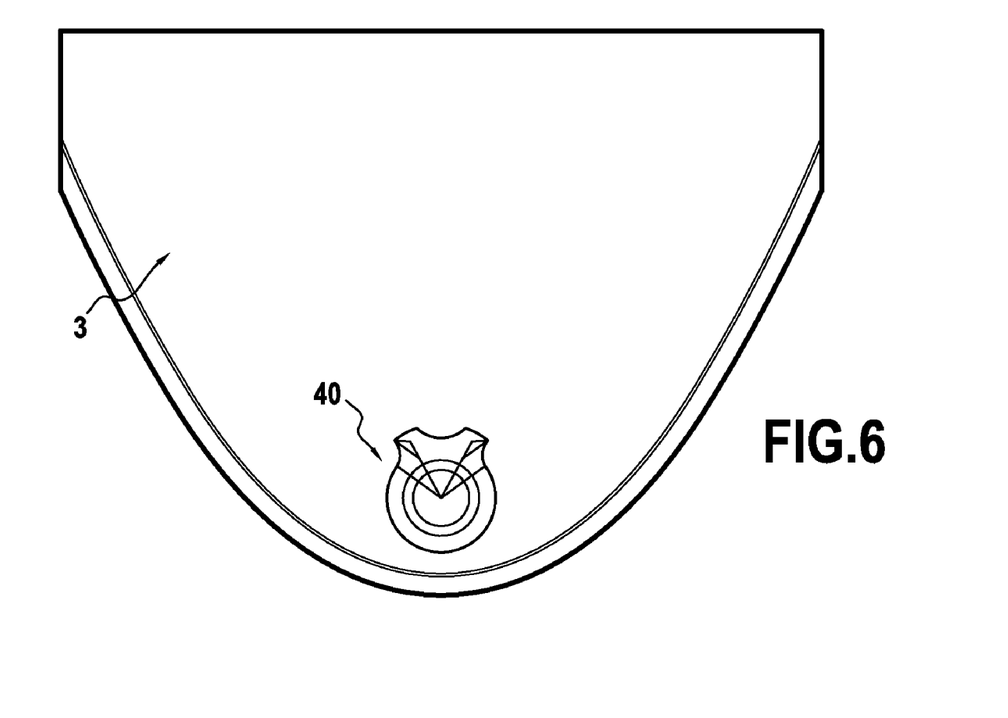
FIG. 6 illustrates, schematically and partially, an optical device according to another embodiment of the invention.
Figure 7:
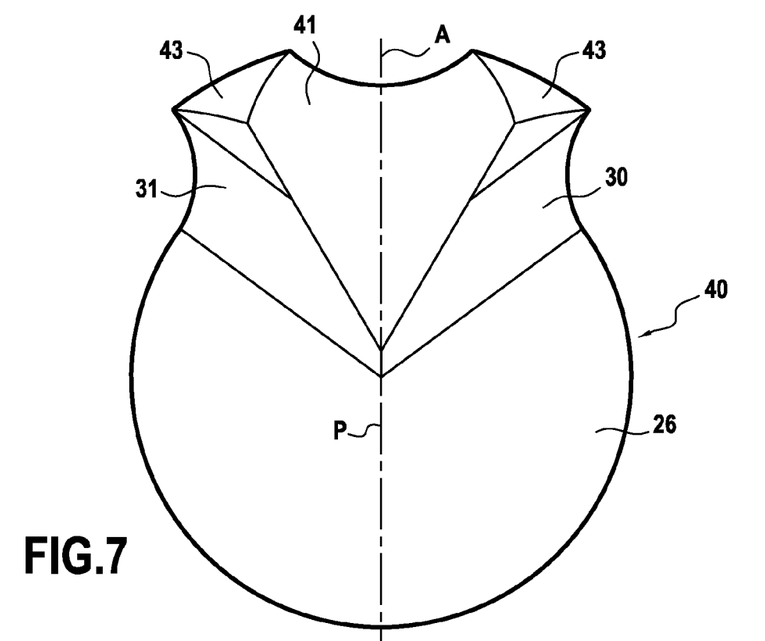
FIG. 7 represents, schematically and partially, the coupling portion of the light guide of the device in FIG. 6.
Figure 8:
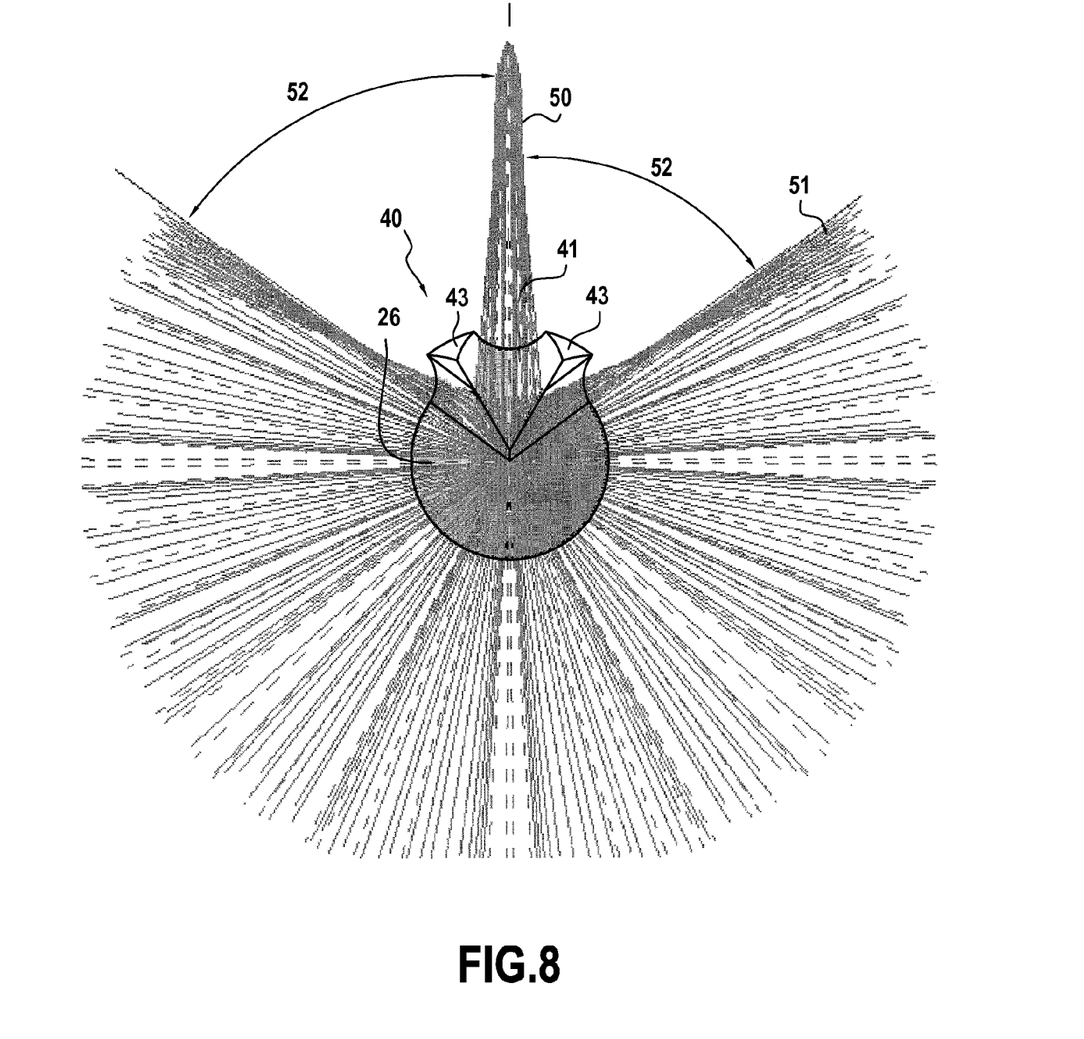
FIG. 8 illustrates schematically the path of the rays of light for the coupling portion in FIG. 7.

FIGS. 6 to 8 show a coupling portion 40 according to another embodiment of the invention.

In this example, the intake surface of the light from the LED into the guide is flat.

As well as the second reflection facet 26 in the form of a section of a cone with a parabolic section, this coupling portion 40 comprises a first reflection facet 41, which is substantially in the form of a section of a paraboloid which makes it possible to concentrate light on the optical axis A towards the output surface 5.

This facet 41 is connected to the facet 26 by means of transition facets 30 and 31, in the manner of the procedure previously described.

The first reflection facet 41 and the connection facets 30 and 31 of the coupling portion 40 are bordered by optically neutral connection facets 43, i.e., the light which is obtained from the LED 2 does not reach these connection facets 43.

Each connection facet 43 can, for example, be formed by:

a horizontal generatrix of the elliptical type, which makes it possible to convey the rays to the reflection surface; and a parabolic vertical profile which guarantees that the rays form a relatively small angle with the upper and lower surfaces of the sheet.

The connection facet 43 can additionally be defined as a surface in order to transform the spherical wave which is obtained from the source into a cylindrical wave which is focused on an axis perpendicular to the sheet.

The coupling portion 40 has symmetry relative to a plane of symmetry P which contains the transverse axis Y of the coupling portion.

As a variant, the coupling portion 40 can be asymmetrical when the rear surfaces are asymmetrical, in particular when the dimensions of the rear surfaces are asymmetrical.

FIG. 8 illustrates the path of the rays of light obtained by the coupling portion 40 in FIGS. 6 and 7.

The angular opening of the first beam 50, measured, for example, on a plane perpendicular to the transverse axis Y, is, for example, substantially 20° or less.

When the first beam 50 is emitted from the coupling portion 40, it has an angular opening which is smaller than that of the second beam 51, and in particular at least twice as small, for example, ten times as small.

In the example concerned, the rays of the second beam 51 are propagated substantially radially around the transverse axis Y, when they are emitted from the coupling portion 40.

When the first and second beams 50 and 51 are emitted from the coupling portion 40, they are disjointed, and are separated from one another by a dark area 52.

Figure 9:
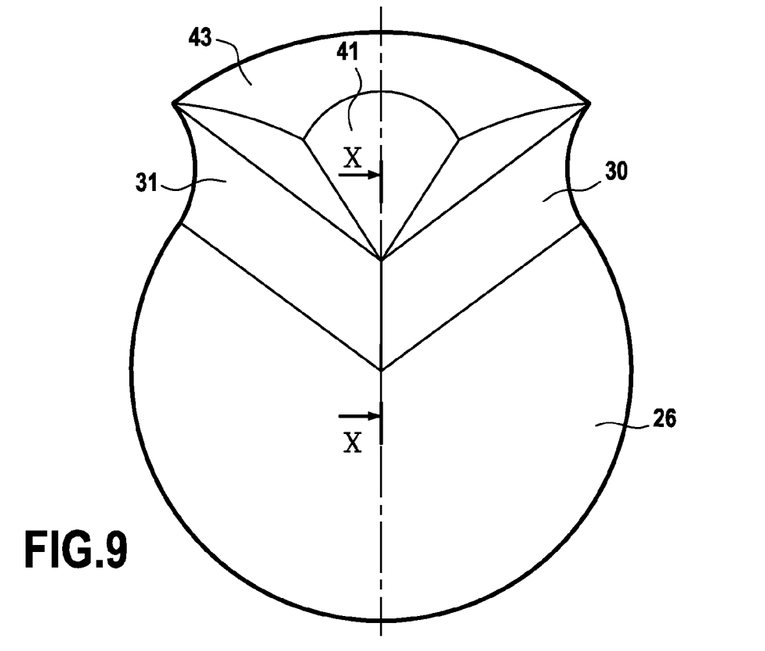
FIGS. 9 and 10 represent, schematically and partially, according to two different views, a coupling portion according to another embodiment of the invention.
Figure 10:
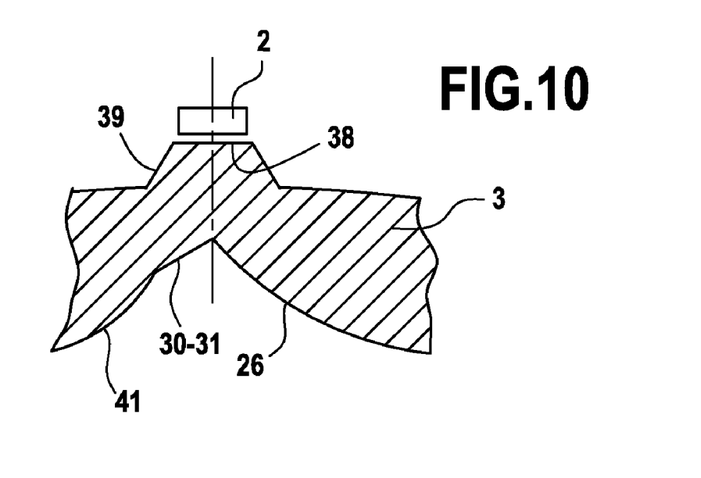

According to another example illustrated in FIGS. 9 and 10, the coupling portion 40 comprises a single connection facet 43, instead of two in the example in FIG. 7.

This is an indirect consequence of the geometry described in the examples in FIGS. 9 and 10. The focal point of the first area 41 is adjusted such as to modify the surface covered by the area 41, in comparison with the transition areas.

In the example concerned, the LED 2 is disposed on the top 38 of a substantially frusto-conical portion 39 of the light guide 3, as illustrated in FIG. 10.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An optical device, in particular for a motor vehicle, such as a lighting or signaling device, said optical device comprising at least one light guide which is designed to guide at least part of the light which is emitted by a source of light, said at least one light guide comprising at least one output surface and at least one main reflection surface, which is designed to reflect towards said at least one output surface light which is propagated in said at least one light guide, said at least one light guide comprising a coupling portion for coupling with said source of light, said coupling portion having a transverse axis (Y), a first reflection facet and a second reflection facet, wherein said coupling portion is arranged such that a second light beam which is emitted from said second reflection facet is propagated in said at least one light guide around said transverse axis having a second reflection facet angle of less than 360°, and said first reflection facet is disposed on a plane generally perpendicular to the said transverse axis and propagates a first light beam;

said first reflection facet adapted to direct light from said at least one light source in a first angular opening toward said at least one output surface and without reflection on said at least one main reflective surface;

said second reflection facet adapted to direct light from said at least one light source with a second angular opening toward said at least one main reflective surface with a second angular opening which reflects said light toward said at least one output surface;

said first and second angular openings having different angular orientations with respect to said transverse axis, with said first angular opening being less than said second facet angle; and said first and second angular openings being angular paths of light measured on a plane generally perpendicular to said transverse axis (Y).

2. The optical device according to claim 1, wherein said coupling portion is arranged such that the light which is emitted from said coupling portion forms two light beams, said first light beam being propagated by said first reflective surface in said at least one light guide such as to reach said at least one output surface of said at least one light guide directly, and said second light beam being propagated by said second reflective surface in said at least one light guide such as to reach said at least one main reflection surface, and in that the rays of said first light beam reach said at least one output surface according to an angle which is selected such that these rays can be emitted from said at least one light guide.

3. The optical device according to claim 2, wherein said rays of said second light beam are propagated substantially radially around said transverse axis (Y) when they are emitted from said coupling portion.

4. The optical device according to claim 2, wherein said coupling portion comprises a first reflection facet which is designed to return said light which is obtained from said source of light directly towards said at least one output surface of said at least one light guide, said first reflection facet having substantially a form which is selected in particular from amongst: a portion of inclined plane, or a section of a cylinder, or a section of a paraboloid.

5. The optical device according to claim 2, wherein said second reflection facet has a form which is selected from amongst: a section of a cone, or a section of a paraboloid.

6. The optical device according to claim 2, wherein said total angular opening of said first light beam, which is measured on said plane perpendicular to said transverse axis (Y), is substantially equal to 20° or less.

7. The optical device according to claim 6, wherein said rays of said second light beam are propagated substantially radially around said transverse axis (Y) when they are emitted from said coupling portion.

8. The optical device according to claim 6, wherein said coupling portion comprises said first reflection facet which is designed to return said light which is obtained from said source of light directly towards said at least one output surface of said at least one light guide, said first reflection facet having substantially a form which is selected in particular from amongst: a portion of inclined plane, or a section of a cylinder, or a section of a paraboloid.

9. The optical device according to claim 6, wherein said second reflection facet has a form which is selected from amongst: a section of a cone, or a section of a paraboloid.

10. The optical device according to claim 1, wherein the rays of a second light beam are propagated substantially radially around said transverse axis (Y) when they are emitted from said coupling portion.

11. The optical device according to claim 10, wherein said coupling portion comprises a first reflection facet which is designed to return said light which is obtained from said source of light directly towards said at least one output surface of said at least one light guide, said first reflection facet having substantially a form which is selected in particular from amongst: a portion of inclined plane, or a section of a cylinder, or a section of a paraboloid.

12. The optical device according to claim 10, wherein said second reflection facet has a form which is selected from amongst: a section of a cone, or a section of a paraboloid.

13. The optical device according to claim 1, wherein said first reflection facet which is designed to return said light which is obtained from said source of light directly towards said at least one output surface of said at least one light guide, said first reflection facet having substantially a form which is selected in particular from amongst: a portion of inclined plane, or a section of a cylinder, or a section of a paraboloid.

14. The optical device according to claim 13, wherein said second reflection facet has a form which is selected from amongst: a section of a cone, or a section of a paraboloid.

15. The optical device according to claim 1, wherein said second reflection facet, which is designed to return said light obtained from said source of light towards said at least one main reflection surface of said at least one light guide, said second reflection facet having in particular, on its angular extent (ANG) around said transverse axis of said coupling portion, symmetry of revolution relative to said transverse axis (Y).

16. The optical device according to claim 15, wherein said second reflection facet has a form which is selected from amongst: a section of a cone, or a section of a paraboloid.

17. The optical device according to claim 1, wherein a light source is disposed on a top of a substantially frusto-conical portion of said at least one light guide.

18. An optical device, in particular for a motor vehicle, such as a lighting or signaling device, said optical device comprising at least one light guide which is designed to guide at least part of the light which is emitted by a source of light, said at least one light guide comprising at least one output surface and at least one main reflection surface, which is designed to reflect towards said at least one output surface light which is propagated in said at least one light guide, said at least one light guide comprising a coupling portion for coupling with said source of light, said coupling portion having a transverse axis (Y), a first reflective facet and a second reflective facet, wherein said coupling portion is arranged such that a second light beam which is emitted from said second reflection facet is propagated in said at least one light guide around said transverse axis, according to a total angular opening, measured around said transverse axis, a second reflection facet angle of less than 360°;

wherein said second reflection facet, which is designed to return said light obtained from said source of light towards said at least one main reflection surface of said at least one light guide having in particular, on its angular extent (ANG) around said transverse axis of said coupling portion, symmetry of revolution relative to said transverse axis (Y); and said first reflection facet of and said second reflection facets facet of said coupling portion are connected to one another via at least one transition facet, which is preferably substantially tangent at least to said second reflection facet, and in particular is designed to reflect said light towards said at least one main reflection surface.

19. The optical device according to claim 18, wherein said at least one transition facet is formed by a portion of a surface of revolution.

20. An optical device, in particular for a motor vehicle, such as a lighting or signaling device, said optical device comprising at least one light guide which is designed to guide at least part of the light which is emitted by a source of light, said at least one light guide comprising at least one output surface and at least one main reflection surface, which is designed to reflect towards said at least one output surface light which is propagated in said at least one light guide, said at least one light guide comprising a coupling portion for coupling with said source of light, said coupling portion having a transverse axis (Y), a first reflective facet and a second reflective facet, wherein said coupling portion is arranged such that a second light beam which is emitted from said second reflection facet is propagated in said at least one light guide around said transverse axis, according to a total angular opening, measured around said transverse axis, a second reflection facet angle of less than 360°;

wherein said coupling portion comprises a first reflection facet which is designed to return said light which is obtained from said source of light directly towards said at least one output surface of said at least one light guide having substantially a form which is selected in particular from amongst: a portion of inclined plane, or a section of a cylinder, or a section of a paraboloid;

wherein said first reflection facet of said coupling portion is bordered by at least one optically neutral connection facet.

21. An optical device, in particular for a motor vehicle, such as a lighting or signaling device, said optical device comprising at least one light guide which is designed to guide at least part of the said light which is emitted by a source of light, said at least one light guide comprising at least one output surface and at least one main reflection surface, which is designed to reflect towards said at least one output surface light which, is propagated in said at least one light guide, said at least one light guide comprising a coupling portion for coupling with said source of light, said coupling portion having a transverse axis (Y) a first reflection facet and a second reflection facet, wherein said coupling portion is arranged such that a second light beam which is emitted from said second reflection facet is propagated in said at least one light guide around said transverse axis having a second reflection facet angle of less than 360°, said first reflection facet is disposed on a plane generally perpendicular to the said transverse axis and propagates a first light beam;

said first reflection facet adapted to direct light from said at least one light source in a first angular opening toward said at least one output surface and without reflection on said at least one main reflective surface;

said second reflection facet adapted to direct light from said at least one light source with a second angular opening toward said at least one main reflective surface with a second angular opening which reflects said light toward said at least one output surface;

said first and second angular openings having different angular orientations with respect to said transverse axis, with said first angular opening being less than said second facet angle; and said first and second angular openings being angular path of light measured on a plane generally perpendicular to said transverse axis (Y).

22. The optical device according to claim 21, wherein said coupling portion is arranged such that said light which is emitted from said coupling portion forms two light beams, a first light beam being propagated in said at least one light guide such as to reach said at least one output surface of said at least one light guide directly, and a second light beam being propagated in said at least one light guide such as to reach said at least one main reflection surface, and in that said rays of said first light beam reach said at least one output surface according to an angle which is selected such that these rays can be emitted from said at least one light guide.

23. The optical device according to claim 22, wherein said total angular opening of said first light beam, which is measured on said plane perpendicular to said transverse axis (Y), is substantially equal to 20° or less.

24. The optical device according to claim 21, wherein said rays of said second light beam are propagated substantially radially around said transverse axis (Y) when they are emitted from said coupling portion.

* * * * *